T. A. BURNS.
APPARATUS FOR SOLUTIONING TIRE BEADS.
APPLICATION FILED NOV. 29, 1920.
1,422,083.
Patented July 11, 1922.
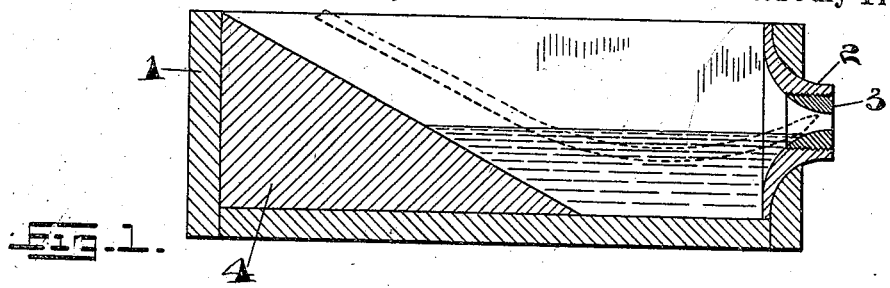
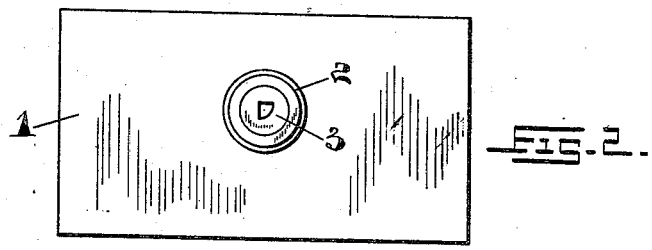
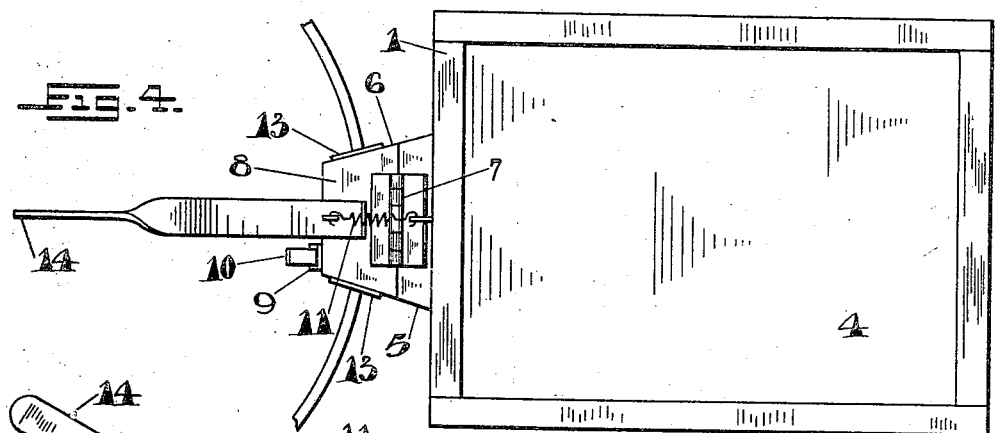
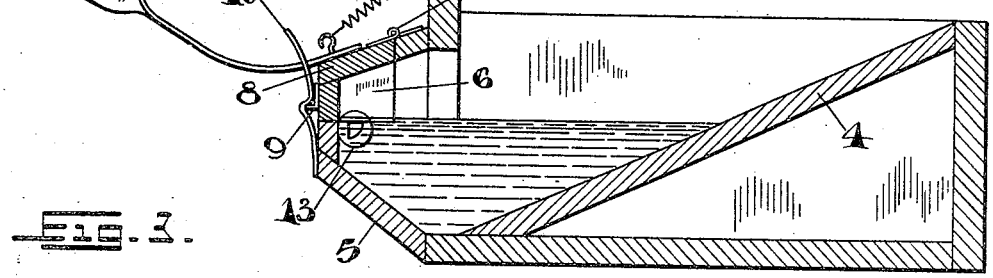
INVENTOR.
T. A. Burns.
BY J. Edward Mayber
ATTY.

UNITED STATES PATENT OFFICE.

THOMAS A. BURNS, OF TORONTO, ONTARIO, CANADA, ASSIGNOR TO DUNLOP TIRE AND RUBBER GOODS COMPANY, LIMITED, OF TORONTO, ONTARIO, CANADA.

APPARATUS FOR SOLUTIONING TIRE BEADS.

1,422,083.     Specification of Letters Patent.     Patented July 11, 1922.

Application filed November 29, 1920. Serial No. 426,997.

*To all whom it may concern:*

Be it known that I, THOMAS A. BURNS, of the city of Toronto, in the county of York, Province of Ontario, Canada, a subject of the King of Great Britain, have invented certain new and useful Improved Apparatus for Solutioning Tire Beads, of which the following is a specification.

Pneumatic tire casings are commonly constructed with beads which are incorporated in the carcass adjacent its edges and in the process of manufacture it becomes necessary to coat such beads with a solution of rubber in a suitable solvent. Much difficulty is experienced in applying the solution evenly and the process is wasteful and slow.

My object therefore is to devise a process and apparatus for coating the beads by means of which the solution may be rapidly and evenly applied without waste and with minimum evaporation of the solvent.

I attain my object by means of the process and apparatus hereinafter described. The apparatus is illustrated in the accompanying drawings in which—

Fig. 1 is a longitudinal section of a simple form of apparatus constructed in accordance with my invention;

Fig. 2 a front elevation of the same;

Fig. 3 a longitudinal section of a form of apparatus specially adapted for solutioning endless beads; and Fig. 4 a plan view of the same.

In the drawings like numerals of reference indicate corresponding parts in the different figures.

Referring particularly to Figs. 1 and 2, 1 is a solution tank. In one wall of this tank is formed an opening in which is fitted a die holder 2. Into this die holder is screwed or otherwise secured a steel die 3, having an opening therein of substantially the same shape as the cross section of the bead to be solutioned. The dimensions of this opening will be very slightly greater than the dimensions of the cross section of the bead.

The mode of operation is as follows. A bead is passed through the solution in the tank and then drawn through the opening. The result is that, owing to the comparatively close fit of the bead in the die, that as the bead is drawn through a very thin skin of solution is left adhering to the surface of the bead, which skin is necessarily of substantially even thickness at all parts of the bead, as the die strictly limits the thickness of the coating at all times.

To facilitate the passage of the bead through the solution and to reduce the quantity of solution necessary to maintain a predetermined level in the tank, I prefer to employ the inclined false bottom 4 in the tank, which bottom inclines from the back towards the front.

The apparatus described will be quite satisfactory for solutioning beads which are formed in strips, which are subsequently spliced in the formation of the tire carcass. For many purposes, however, endless beads are employed, and the solutioning of such beads necessitates the use of a divided die so that the bead may be introduced into the die. The arrangement for this purpose is shown in Figs. 2 and 3. The construction of the tank is substantially the same as in the form shown in Figs. 1 and 2, but is preferably provided with an extension 5 at one end. In the wall of this section, I provide a vertically movable part 6. The preferred arrangement is to hinge this part as indicated at 7 so that it may be swung upwardly. It is most convenient, however, to provide opposite walls of the extension 5 with such vertically movable parts, and to connect such parts by a top member 8 by means of which the parts are connected to the hinge 7. The top member is provided with a keeper 9 adapted to engage a spring latch 10 secured to the lower part of the extension 5. A coil spring 11 secured to the member 8 and to a stationary part of the tank tends to raise the member 8 with the vertically movable parts 6. A handle 13 is preferably provided by means of which the top member 8 with the vertically movable members may be drawn down to the operative position.

The vertically movable parts 6 each carry one part of a divided die plate 13, the other part of each die plate being secured to the stationary walls of the extension.

It will be noted that the side walls of the extension are inclined so that they lie in a plane substantially radial of an annular bead when the latter is in position with the apparatus as shown in Fig. 4. The die plates thus lie substantially in planes normal to the bead.

The mode of operation is as follows. A very viscid solution is employed, which does not flow at all readily and the level is maintained substantially up to the top of the aperture in the die plate. When a bead is to be solutioned, the latch 10 is released and the handle 12 operated to lift the upper parts of the die plates. A bead is then quickly placed in position in the die plates and the latter brought down and locked in the position shown in Fig. 3. The bead is then drawn through the extension 5 with its die plates until the whole surface has been coated. The upper parts of the die plates are then raised, the bead removed and a fresh bead placed in position. The solution flows so slowly and the time occupied in the operation of changing beads is so short that no overflow of solution takes place despite the fact that its level is substantially up to the top of the openings in the die plates.

What I claim as my invention is:—

1. Apparatus for solutioning tire beads comprising a solution tank having part of a side wall movable to and from its normal position; and a divided apertured die plate partly carried by the side wall and partly by the movable part.

2. Apparatus for solutioning tire beads comprising a solution tank having part of a side wall formed of a part hinged to swing to and from its normal position; a latch for releasably retaining the hinged part in its normal position; and a spring tending to swing up the hinged part; and a divided apertured die plate partly carried by the side wall and partly by the hinged part.

3. Apparatus for solutioning tire beads comprising a solution tank having vertical side walls inclined towards one another, opposite parts of each side wall being movable to and from their normal position, and divided apertured die plates each having part carried by a side wall and part by one of the movable parts.

Signed at Toronto, Ontario, this eleventh day of November, 1920.

THOMAS A. BURNS. [L. S.]

Witnesses:
C. WILSON,
C. M. SLACK.